(12) United States Patent
Niimi (10) Patent No.: US 8,119,303 B2
(45) Date of Patent: Feb. 21, 2012

(54) FUEL CELL MODULE

(75) Inventor: Haruhisa Niimi, Tokai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 616 days.

(21) Appl. No.: 12/302,971

(22) PCT Filed: Aug. 16, 2007

(86) PCT No.: PCT/JP2007/066320
§ 371 (c)(1),
(2), (4) Date: Dec. 1, 2008

(87) PCT Pub. No.: WO2008/026492
PCT Pub. Date: Mar. 6, 2008

(65) Prior Publication Data
US 2009/0197142 A1    Aug. 6, 2009

(30) Foreign Application Priority Data

Aug. 28, 2006  (JP) .................................. 2006-230858

(51) Int. Cl.
*H01M 2/02* (2006.01)
(52) U.S. Cl. ........ 429/508; 429/452; 429/467; 429/470; 429/471; 429/507
(58) Field of Classification Search .................. 429/508, 429/507, 452, 471, 467, 470
See application file for complete search history.

(56) References Cited

U.S. PATENT DOCUMENTS

2002/0187380 A1 * 12/2002 Tanaka et al. ................... 429/34

FOREIGN PATENT DOCUMENTS

| DE | 102 24 962 A1 | 2/2003 |
|---|---|---|
| DE | 103 34 130 A1 | 2/2005 |
| JP | 10-134834 A | 5/1998 |
| JP | 2002-367651 A | 12/2002 |
| JP | 2002-367652 A | 12/2002 |
| JP | 2004-127787 A | 4/2004 |
| JP | 2005-100755 A | 4/2005 |
| JP | 2006-331648 A | 12/2006 |

* cited by examiner

*Primary Examiner* — Jane Rhee
(74) *Attorney, Agent, or Firm* — Kenyon & Kenyon LLP (57) ABSTRACT

The number of assembling steps of a fuel cell module is reduced. Moreover, permeating of moisture from the outside is suppressed. To realize this, a fuel cell module of the present invention includes a fuel cell having a structure in which both ends of a cell laminate in a laminating direction of cells are held by end plates, a fuel cell case in which the fuel cell is received, and a plurality of holding portions which hold the fuel cell via the end plates. Each holding portion includes a first fastening member having a part thereof bonded to the end plate, a mount member interposed between the first fastening member and the fuel cell case, and a second fastening member which fastens the mount member and the fuel cell case, and the fuel cell case is provided with a protrusion part having such a shape as to cover the part of the first fastening member while avoiding interference with the part.

8 Claims, 4 Drawing Sheets

FUEL CELL MODULE

This is a 371 national phase application of PCT/JP2007/066320 filed 16 Aug. 2007, which claims priority to Japanese Patent Application No. 2006-230858 filed 28 Aug. 2006, the contents of which are incorporated herein by reference.

BACKGROUND OF THE INVENTION

1. Field of the Invention

The present invention relates to a fuel cell module. More particularly, it relates to the improvement of a structure of a fuel cell case or the like in a fuel cell module.

2. Description of Related Art

In general, a fuel cell (e.g., a polymer electrolyte fuel cell) is constituted by laminating a plurality of cells each including an electrolyte held between separators, and arranging end plates and the like at both ends of each cell in a laminating direction. Such a fuel cell is further received in a fuel cell case or the like to form a fuel cell module.

The fuel cell module is utilized as a vehicle-mounted power generation system of a fuel cell hybrid vehicle (FCHV) or the like. In this case, the module is attached to a frame, a stack case or the like of the vehicle via a mount insulator for absorbing vibration. As the fuel cell module attached to the stack case or the like via the mount insulator in this manner, a module including a reinforcement cover which covers bolts for bonding the end plates to the mount insulator is known (e.g., see Patent Document 1).

[Patent Document 1] Japanese Patent Application Laid-Open No. 2002-367651

SUMMARY OF THE INVENTION

However, the above-mentioned structure has a problem that the number of component assembling steps is large, and a further problem that moisture sometimes permeates from the outside.

An object of the present invention is to provide a fuel cell module capable of reducing the number of assembling steps and suppressing permeating of moisture from the outside.

The present inventor has performed various investigations to achieve such object. As described above, to attach the fuel cell module to a vehicle or the like, a mount insulator made of a rubber or the like for absorbing vibration is sometimes interposed. However, when a cover (the mount insulator cover) to cover the mount insulator, bolts for fixing this mount insulator and the like is further provided. In this case, the number of the assembling steps accordingly increases. In case of the permeating of water, the water sometimes permeates the module from a portion provided with the mount insulator cover, and hence a seal member and drain holes have to be sometimes provided in order to handle this permeation. When a certain disadvantage is generated in a waterproof or insulation structure, an insulation defect might be caused. The present inventor has performed various investigations on these contents to obtain an idea for solving such problem.

The present invention has been developed based on such an idea, and is a fuel cell module comprising: unit cells which generate a power owing to an electrochemical reaction of a reactant gas; a cell laminate formed by laminating the plurality of unit cells; a fuel cell having a structure in which both ends of the cell laminate in a laminating direction of the cells are held by end plates; a fuel cell case in which the fuel cell is received; and a plurality of holding portions which hold the fuel cell via the end plates, characterized in that each of the holding portions including a first fastening member having a part thereof bonded to the end plate, a mount member interposed between the first fastening member and the fuel cell case, and a second fastening member which fastens the mount member and the fuel cell case, the fuel cell case being provided with a protrusion part having such a shape as to cover the part of the first fastening member while avoiding interference with the part.

When fastening members such as bolts for fastening the fuel cell and the fuel cell case are used, a part of each bolt sometimes has a protruding shape. However, in the present invention, the protrusion part formed on the fuel cell case covers a portion having such a protruding shape while avoiding the interference with the portion. That is, a structure is provided in which the fuel cell case can simply be attached to cover the first fastening member without interfering with the member. Therefore, another member (e.g., a mount insulator cover) for covering the mount member and the first fastening member does not have to be separately provided, and hence there is an advantage that the number of assembling steps is accordingly reduced.

Moreover, from a viewpoint of suppressing the permeating of moisture, as one example, means for separately providing a seal member between the conventional cover (the mount insulator cover) and the fuel cell case may be employed, which cannot be said to be preferable because the number of the assembling steps further increases. In this respect, there is also an advantage that a part of the fuel cell case is formed as the protrusion part in the present invention, whereby the permeating of the moisture from the outside can effectively be suppressed without unnecessarily increasing the number of the steps.

In such a fuel cell module, it is preferable that a contact surface between the fuel cell case and the mount member is subjected to waterproof processing. In consequence, the permeating of the moisture from the contact surface between the fuel cell case and the mount member is suppressed, and a waterproof property can further be improved.

Moreover, it is also preferable that at least a part of an inner surface of the protrusion part is subjected to an insulation treatment. For example, even when a part of the fuel cell case is deformed, there is an increasing possibility that an insulated state between the fuel cell case and the above-mentioned first fastening member is maintained.

In the present invention, the mount member functions as an insulator which absorbs and buffers vibration applied to the fuel cell and which maintains the fuel cell and the fuel cell case in an insulated state.

DETAILED DESCRIPTION OF PREFERRED EMBODIMENT

A preferable embodiment of the present invention will hereinafter be described with reference to the drawings.

FIGS. 1 to 5 show an embodiment of a fuel cell module according to the present invention. A fuel cell module 10 according to the present invention is constituted as a module including unit cells (hereinafter referred to also as cells) 2 which generate a power owing to an electrochemical reaction of a reactant gas; a cell laminate 3 formed by laminating a plurality of cells 2; a fuel cell 1 having a structure in which both ends of the cell laminate 3 in a laminating direction of the cells are held by end plates 8; a fuel cell case 4 in which the fuel cell 1 is received; and a plurality of holding portions 5 which hold the fuel cell 1 via the end plates 8. In the present embodiment, each of the holding portions 5 includes a first fastening member 51, a second fastening member 52 and a mount member 53. The fuel cell case 4 is provided with a protrusion part 41 which covers the first fastening member 51.

First, the entire constitution of a fuel cell system 100 including the fuel cell 1, gas piping systems 300, 400 and the like, and a constitution of each cell 2 constituting the fuel cell 1 will hereinafter be described. Afterward, a structure of the holding portions 5 and the fuel cell case 4 in the fuel cell system 100 will be described.

Figure 2:
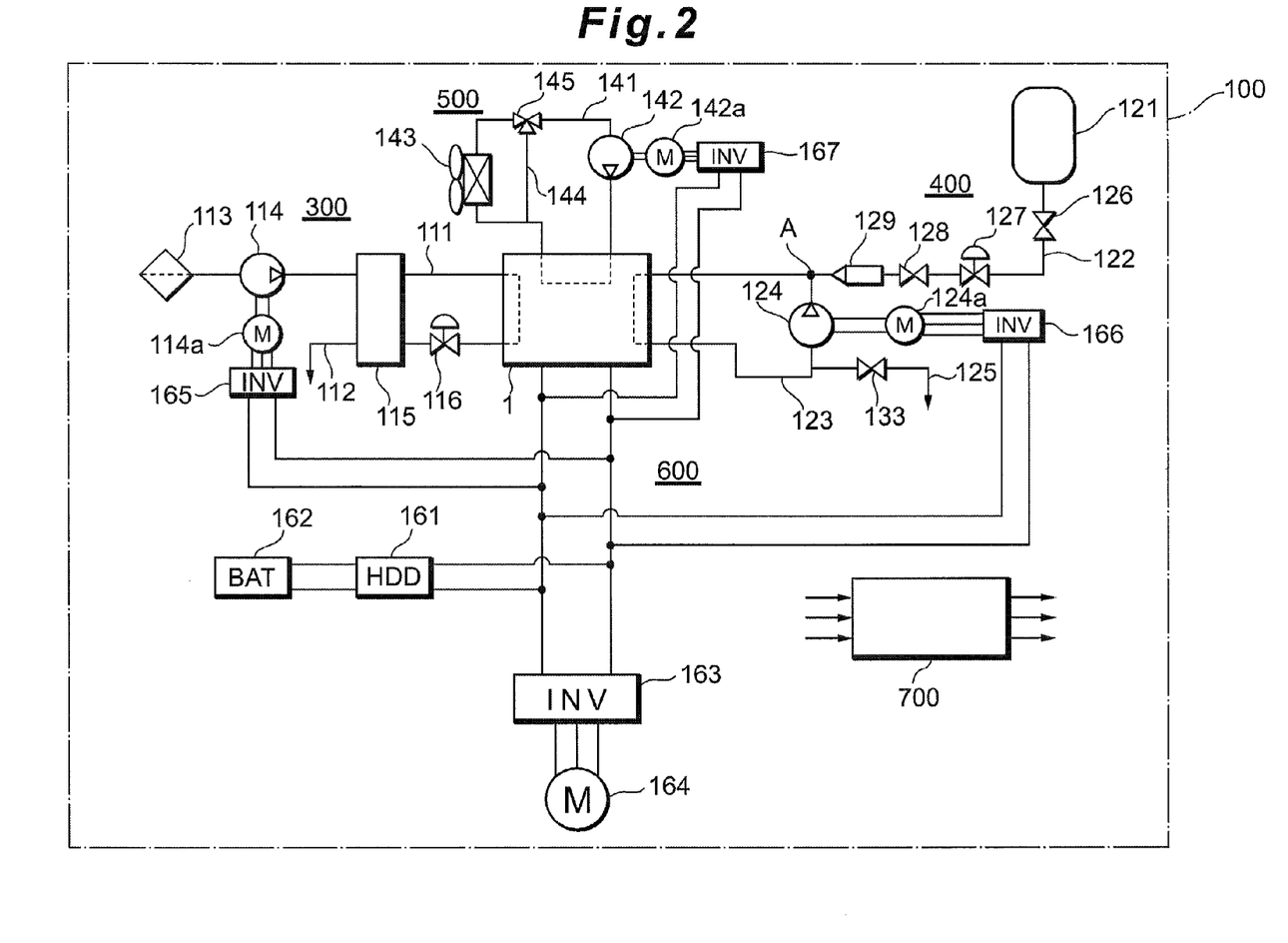
FIG. 2 is a diagram showing a constitution of a fuel cell system in the present embodiment.

FIG. 2 shows a schematic constitution of the fuel cell system 100 in the present embodiment. As shown in the drawing, the fuel cell system 100 includes the fuel cell 1, the oxidizing gas piping system 300 which supplies air (oxygen) as an oxidizing gas to the fuel cell 1, the fuel gas piping system 400 which supplies hydrogen as a fuel gas to the fuel cell 1, a refrigerant piping system 500 which supplies a refrigerant to the fuel cell 1 to cool the fuel cell 1, a power system 600 which charges/discharges a power of the system, and a control section 700 which generally controls the whole system.

Figure 3:
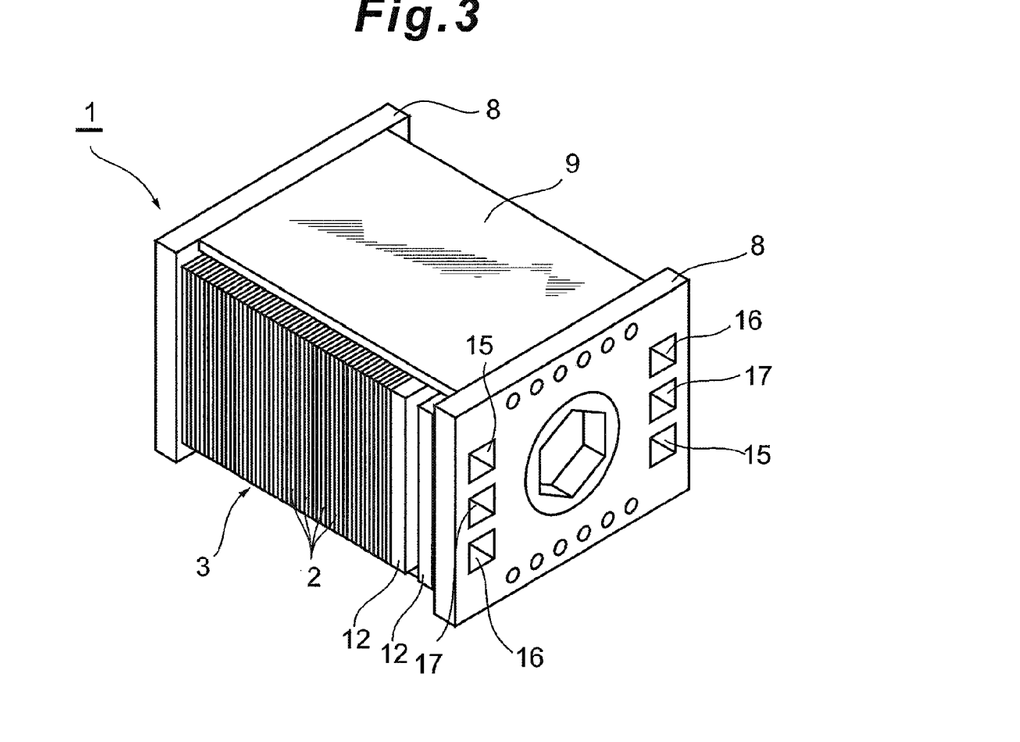
FIG. 3 is a perspective view schematically showing a structure example of a fuel cell stack.

The fuel cell 1 is constituted of, for example, a polymer electrolyte type, and has a stack structure in which a plurality of cells (unit cells) 2 are laminated (see FIG. 3). Each cell 2 has an air pole on one surface of an electrolyte including an ion exchange film, and a fuel pole on the other surface of the electrolyte, and further has a pair of separators 20 (denoted with reference numerals 20a, 20b, respectively, in FIG. 1) so as to hold the air pole and the fuel pole from opposite sides. The fuel gas is supplied to a fuel gas channel of the one separator 20, and the oxidizing gas is supplied to an oxidizing gas channel of the other separator 20 to generate a power by the fuel cell 1 to which these gases have been supplied.

The oxidizing gas pipe system 300 has an oxidizing gas supply path 111 through which the oxidizing gas to be supplied to the fuel cell 1 flows, and an exhaust path 112 through which an oxidizing off-gas discharged from the fuel cell 1 flows. The oxidizing gas supply path 111 is provided with a compressor 114 which takes the oxidizing gas via a filter 113, and a humidifier 115 which humidifies the oxidizing gas fed under pressure by the compressor 114. The oxidizing off-gas flowing through the exhaust path 112 passes through a back pressure adjustment valve 116 for use in moisture exchange in the humidifier 115, and is finally discharged as an exhaust gas to atmospheric air outside the system. The compressor 114 is driven by a motor 114a to take the oxidizing gas from the atmospheric air.

The fuel gas piping system 400 has a hydrogen supply source 121, a hydrogen gas supply path 122 through which a hydrogen gas supplied from the hydrogen supply source 121 to the fuel cell 1 flows, a circulation path 123 for returning a hydrogen-off gas (a fuel-off gas) discharged from the fuel cell 1 to a joining point A of the hydrogen gas supply path 122, a pump 124 which feeds the hydrogen-off gas in the circulation path 123 under pressure to the hydrogen gas supply path 122, and an exhaust path 125 branched from and connected to the circulation path 123.

The hydrogen supply source 121 is constituted of, for example, a high pressure tank, a hydrogen occlusion alloy or the like so that the hydrogen gas of, for example, 35 MPa or 70 MPa can be stored. When a main valve 126 of the hydrogen supply source 121 is opened, the hydrogen gas flows out to the hydrogen gas supply path 122. A pressure of the hydrogen gas is finally reduced to, for example, about 200 kPa by a pressure reduction valve such as a pressure adjustment valve 127, and the gas is supplied to the fuel cell 1.

A shutoff valve 128 and an injector 129 are provided on an upstream side of the joining point A of the hydrogen gas supply path 122. A circulation system of the hydrogen gas is constituted by allowing communication of a channel on a downstream side of the joining point A of the hydrogen gas supply path 122, a fuel gas channel formed in the separator of the fuel cell 1 and the circulation path 123 in order. The pump 124 is driven by a motor 124a to circulate and supply the hydrogen gas of the circulation system through the fuel cell 1.

The injector 129 is an electromagnetic driving type of opening/closing valve capable of directly driving a valve body with an electromagnetic driving power in a predetermined driving period to detach the valve body from a valve seat, whereby a gas flow rate and a gas pressure can be adjusted. For example, the injector 129 of the present embodiment includes the valve seat having jet holes for jetting the hydrogen gas or the like, a nozzle body which supplies and guide the hydrogen gas or the like to the jet holes, and the valve body which is movably held in an axial direction (a gas flow direction) with respect to this nozzle body to open and close the jet holes. The valve body of the injector 129 is driven by, for example, a solenoid, and a pulse-like exciting current to be supplied to this solenoid can be turned on or off to switch opening areas of the jet holes in two stages or multistage.

The exhaust path 125 is provided with a purge valve 133 which is a shutoff valve. When the fuel cell system 100 operates, the purge valve 133 is appropriately opened to discharge, to a hydrogen dilution unit (not shown), impurities in the hydrogen-off gas together with the hydrogen-off gas. The purge valve 133 is opened, whereby a concentration of the impurities in the hydrogen-off gas of the circulation path 123 lowers, and a concentration of hydrogen in the hydrogen-off gas to be circulated and supplied rises.

The refrigerant piping system 500 has a refrigerant circulation channel 141 which communicates with a cooling channel in the fuel cell 1, a cooling pump 142 provided in the refrigerant circulation channel 141, a radiator 143 which cools a refrigerant discharged from the fuel cell 1, a bypass channel 144 which bypasses the radiator 143, and a three-way valve (a changeover valve) 145 which sets flow of cooling water (denoted with symbol C in FIG. 1) through the radiator 143 and the bypass channel 144. The cooling pump 142 is driven by a motor 142a to circulate and supply the refrigerant from the refrigerant circulation channel 141 to the fuel cell 1.

The power system 600 includes a high voltage DC/DC converter 161, a battery 162, a traction inverter 163, a traction motor 164, and various auxiliary machine inverters 165, 166 and 167. The high voltage DC/DC converter 161 is a direct-current voltage converter, and has a function of adjusting a direct-current voltage input from the battery 162 to output the voltage toward the traction inverter 163, and a function of adjusting a direct-current voltage input from the fuel cell 1 or the traction motor 164 to output the voltage to the battery 162. The high voltage DC/DC converter 161 realizes charge and discharge of the battery 162 owing to these functions. An output voltage of the fuel cell 1 is controlled by the high voltage DC/DC converter 161.

In the battery 162, battery cells are laminated, and a constant high voltage is a terminal voltage, whereby a surplus power can be charged and a power can auxiliarily be supplied under control of a battery computer (not shown). The traction inverter 163 converts a direct current into a three-phase alternating current to supply the current to the traction motor 164. The traction motor 164 is, for example, a three-phase alternating-current motor, and constitutes a main power source of, for example, a vehicle on which the fuel cell system 100 is mounted.

The auxiliary machine inverters 165, 166 and 167 are electromotive control devices which control driving of the corresponding motors 114a, 124a and 142a. The auxiliary machine inverters 165, 166 and 167 convert direct currents into three-phase alternating currents to supply the currents to the motors 114a, 124a and 142a, respectively. The auxiliary machine inverters 165, 166 and 167 are, for example, PWM inverters of a pulse width modulation system, and convert the direct currents output from the fuel cell 1 or the battery 162 into three-phase alternating-current voltages according to a driving command from the control section 700 to control rotation torques generated in the motors 114a, 124a and 142a.

The control section 700 is constituted as a microcomputer including therein a CPU, an ROM and an RAM. The CPU executes desired computation according to a control program to perform various processing and control such as unfreezing control of the pump 124 described later. The ROM stores a control program and control data to be processed by the CPU. The RAM is used as various working regions mainly for control processing. The control section 700 inputs detection signals of a pressure sensor, a temperature sensor, an outside air temperature sensor and the like for use in the gas system (300, 400) and the refrigerant piping system 500.

Figure 1:
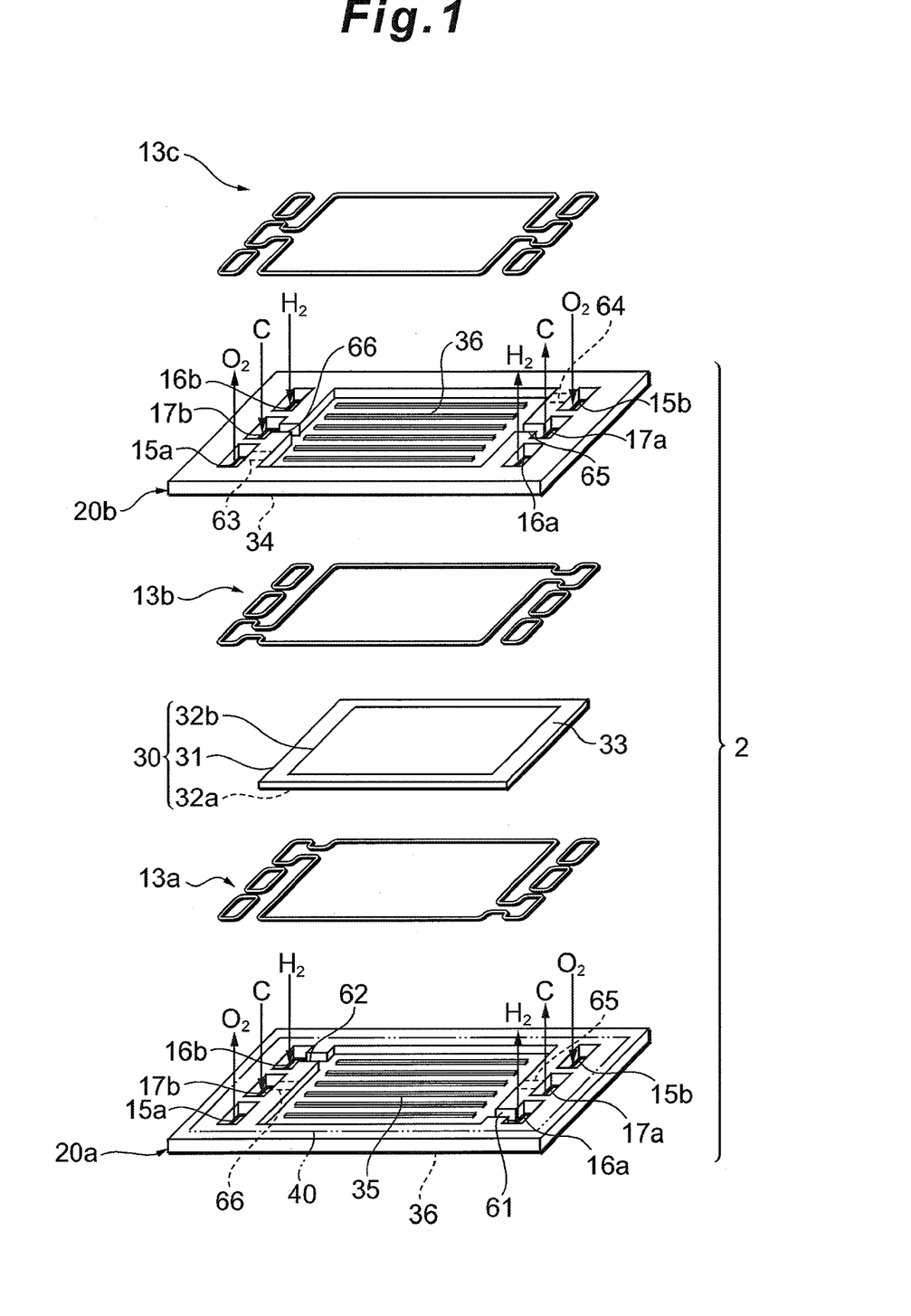
FIG. 1 is an exploded perspective view showing each cell of a cell laminate in an exploded manner.

Next, FIG. 1 shows a schematic constitution of each cell 2 of the fuel cell 1 in the present embodiment. The cells 2 each having a shown constitution are successively laminated to constitute the cell laminate 3 (see FIG. 3). The cell laminate 3 formed in this manner has, for example, both ends thereof held between a pair of end plates 8, and a load is applied in a laminating direction to fasten the end plates in a state in which a tension plate 9 is disposed so as to connect these end plates to each other.

It is to be noted that the fuel cell 1 constituted of such cells 2 and the like is usable as a vehicle-mounted power generation system of, for example, a fuel cell hybrid vehicle (FCHV), but the present invention is not limited to this application. The present invention may be used as a power generation system to be mounted on various mobile bodies (e.g., a ship, an airplane, etc.) and a self-propelled body such as a robot.

Each cell 2 is constituted of an electrolyte such as a membrane electrode assembly (hereinafter referred to as the MEA) 30, a pair of separators 20 (20a, 20b) which hold the MEA 30 therebetween and the like (see FIG. 1). The MEA 30 and the separators 20a, 20b are formed into a substantially rectangular plate-like shape. The MEA 30 is formed so that an outer shape thereof is smaller than that of each separator 20a, 20b.

The MEA 30 is constituted of a polymer electrolyte film (hereinafter also referred to simply as the electrolyte film) 31 including an ion exchange film of a polymer material, and a pair of electrodes (an anode-side diffusion electrode and a cathode-side diffusion electrode) 32a, 32b which hold the electrolyte film 31 from opposite surfaces thereof (see FIG. 1). The electrolyte film 31 is formed so as to be larger than the electrodes 32a, 32b. The electrodes 32a, 32b are bonded to this electrolyte film 31 by, for example, a hot press process except a peripheral edge 33 of the electrolyte film.

The electrodes 32a, 32b constituting the MEA 30 are constituted of, for example, a porous carbon material (a diffusion layer) which carries a catalyst of platinum or the like attached to the surfaces of the material. The hydrogen gas is supplied as the fuel gas (the reactant gas) to one electrode (anode) 32a, and an oxidizing gas (the reactant gas) such as air or an oxidizer is supplied to the other electrode (cathode) 32b, whereby an electrochemical reaction is caused by these two types of reactant gases in the MEA 30 to obtain an electromotive force of the cell 2.

The separators 20 (20a, 20b) are constituted of a gas impermeable conductive material. Examples of the conductive material include carbon, a hard resin having conductivity, and metals such as aluminum and stainless steel. The separators 20 (20a, 20b) of the present embodiment are so-called metal separators formed of a plate-like metal as a base material. It is preferable that a film (e.g., a membrane formed of gold plating) having an excellent corrosion resistance is formed on the surface of this base material on the side of the electrode 32a, 32b.

Moreover, the opposite surfaces of the separators 20a, 20b are provided with groove-like channels constituted of a plurality of concave portions. These channels can be formed by press molding in the separators 20a, 20b of the present embodiment formed of, for example, the plate-like metal as the base material. The groove-like channels formed in this manner constitute a gas channel 34 of the oxidizing gas, a gas channel 35 of the hydrogen gas or a cooling water channel 36. More specifically, a plurality of gas channels 35 of the hydrogen gas are formed in an inner surface of the separator 20a on an electrode 32a side, and a plurality of cooling water channels 36 are formed in a back surface (an outer surface) of the separator (see FIG. 1). Similarly, a plurality of gas channels 34 of the oxidizing gas are formed in an inner surface of the separator 20b on an electrode 32b side, and a plurality of cooling water channels 36 are formed in a back surface (an outer surface) of the separator (see FIG. 1). Furthermore, in the present embodiment, with regard to two adjacent cells 2, 2, in a case where the outer surface of the separator 20a of one cell 2 is attached to the outer surface of the separator 20b of the adjacent cell 2, the cooling water channels 36 of both the surfaces are integrated to form a structure in which a channel having, for example, a rectangular or honeycomb-like section is formed (see FIG. 1).

Furthermore, the separators 20a, 20b described above have such a relation that concave and convex shapes for forming at least a channel of a fluid are reversed in the front surface and the back surface. More specifically, in the separator 20a, the back surface of the convex shape (a protruding rib) forming the gas channel 35 of the hydrogen gas has a concave shape (a recessed groove) of the cooling water channel 36, and the back surface of the concave shape (the recessed groove) of the gas channel 35 has a convex shape (the protruding rib) of the cooling water channel 36. Furthermore, in the separator 20b, the back surface of the convex shape (the protruding rib) of the gas channel 34 of the oxidizing gas has a concave shape (the recessed groove) of the cooling water channel 36, and the back surface of the concave shape (the recessed groove) of the gas channel 34 has a convex shape (the protruding rib) of the cooling water channel 36.

Moreover, close to ends of the separators 20a, 20b in a longitudinal direction (in the vicinity of one end shown on the left side as one faces FIG. 1 in the present embodiment), manifolds 15a on an inlet side of the oxidizing gas, manifolds 16b on an outlet side of the hydrogen gas and manifolds 17b on an outlet side of cooling water are formed. For example, in the present embodiment, these manifolds 15a, 16b and 17b are formed of substantially rectangular or trapezoidal through holes provided in the separators 20a, 20b (see FIG. 1). Furthermore, in ends of the separators 20a, 20b on an opposite side, manifolds 15b on an outlet side of the oxidizing gas, manifolds 16a on an inlet side of the hydrogen gas and manifolds 17a on an inlet side of the cooling water are formed. In the present embodiment, these manifolds 15b, 16a and 17a are formed of substantially rectangular or trapezoidal through holes (see FIG. 1).

Among the above-mentioned manifolds, the inlet-side manifold 16a and the outlet-side manifold 16b for the hydrogen gas in the separator 20a communicate with the gas channel 35 of the hydrogen gas via an inlet-side communication passage 61 and an outlet-side communication passage 62 formed into a groove-like shape in the separator 20a, respectively. Similarly, the inlet-side manifold 15a and the outlet-side manifold 15b for the oxidizing gas in the separator 20b communicate with the gas channel 34 of the oxidizing gas via an inlet-side communication passage 63 and an outlet-side communication passage 64 formed into a groove-like shape in the separator 20b, respectively (see FIG. 1). Furthermore, the inlet-side manifolds 17a and the outlet-side manifolds 17b of the cooling water in the separators 20a, 20b communicate with the cooling water channels 36 via inlet-side communication passages 65 and outlet-side communication passages 66 formed into a groove-like shape in the separators 20a, 20b, respectively. According to the constitution of the separators 20a, 20b described above, the oxidizing gas, the hydrogen gas and the cooling water are supplied to the cell 2. Here, a specific example will be described. When the cells 2 are laminated, for example, the hydrogen gas flows into the gas channels 35 from the inlet-side manifolds 16a of the separators 20a through the communication passages 61, is used in power generation of the MEAs 30, and then flows through the communication passages 62 to the outlet-side manifolds 16b.

Both of a first seal member 13a and a second seal member 13b are formed of a plurality of members (e.g., four small rectangular frame members, a large frame member for forming a fluid channel) (see FIG. 1). Among them, the first seal member 13a is provided between the MEA 30 and the separator 20a. More specifically, the first seal member is disposed so that a part thereof is interposed between the peripheral edge 33 of the electrolyte film 31 and a portion of the separator 20a around the gas channel 35. The second seal member 13b is provided between the MEA 30 and the separator 20b. More specifically, the second seal member is disposed so that a part thereof is interposed between the peripheral edge 33 of the electrolyte film 31 and a portion of the separator 20b around the gas channel 34.

Furthermore, a third seal member 13c formed of a plurality of members (e.g., four small rectangular frame members, a large frame member for forming a fluid channel) is provided between the separator 20b and the separator 20a of the adjacent cells 2, 2 (see FIG. 1). This third seal member 13c is interposed between the portion of the separator 20b around the cooling water channel 36 and the portion of the separator 20a around the cooling water channel 36 to seal between the portions.

It is to be noted that as the first to third seal members 13a to 13c, an elastic member (a gasket) which physically comes in close contact with adjacent members to seal the fluid, an adhesive which is chemically connected to the adjacent members to bond the members or the like may be used. For example, in the present embodiment, members which physically seal owing to elasticity are employed as the first to third seal members 13a to 13c, but a member which is chemically bonded to seal, for example, the adhesive may be employed instead.

A frame-like member 40 is a member (hereinafter referred to as a resin frame) held together with the MEA 30 between the separators 20a and 20b and made of, for example, a resin. For example, in the present embodiment, the resin frame 40 having a thin frame shape is interposed between the separators 20a and 20b so that the resin frame 40 holds at least a part of the MEA 30, for example, a portion along the peripheral edge 33 from a front side and a back side. The resin frame 40 provided in this manner exerts a function of a spacer which supports a fastening force between the separators 20 (20a, 20b), a function of an insulating member, and a function of a reinforcing member which reinforces rigidity of the separators 20 (20a, 20b).

A constitution of the fuel cell 1 will simply be described as follows (see FIG. 3, etc.). The fuel cell 1 of the present embodiment has the cell laminate 3 in which a plurality of unit cells 2 are laminated, and collector plates (not shown) provided with output terminals, insulation plates (not shown) and the end plates 8 are successively arranged outside the unit cells 2, 2 positioned at the both ends of the cell laminate 3, respectively (see FIG. 3). Such cell laminate 3 is bound to a laminated state by the tension plate 9. The tension plate 9 is provided so as to bridge between both the end plates 8 and 8, and for example, a pair of tension plates are arranged so as to face both surfaces of the cell laminate 3. It is to be noted that reference numerals 12 are a pair of pressure plate which hold a plurality of elastic members (not shown) from the laminating direction of the cells 2.

Next, a structure of the holding portion 5, the fuel cell case 4 and the like in the fuel cell module 10 of the present embodiment will be described (see FIG. 5, etc.). The fuel cell module 10 of the present embodiment is constituted of the fuel cell 1 held by the holding portion 5, and the fuel cell case 4 which covers the fuel cell 1.

Figure 4:
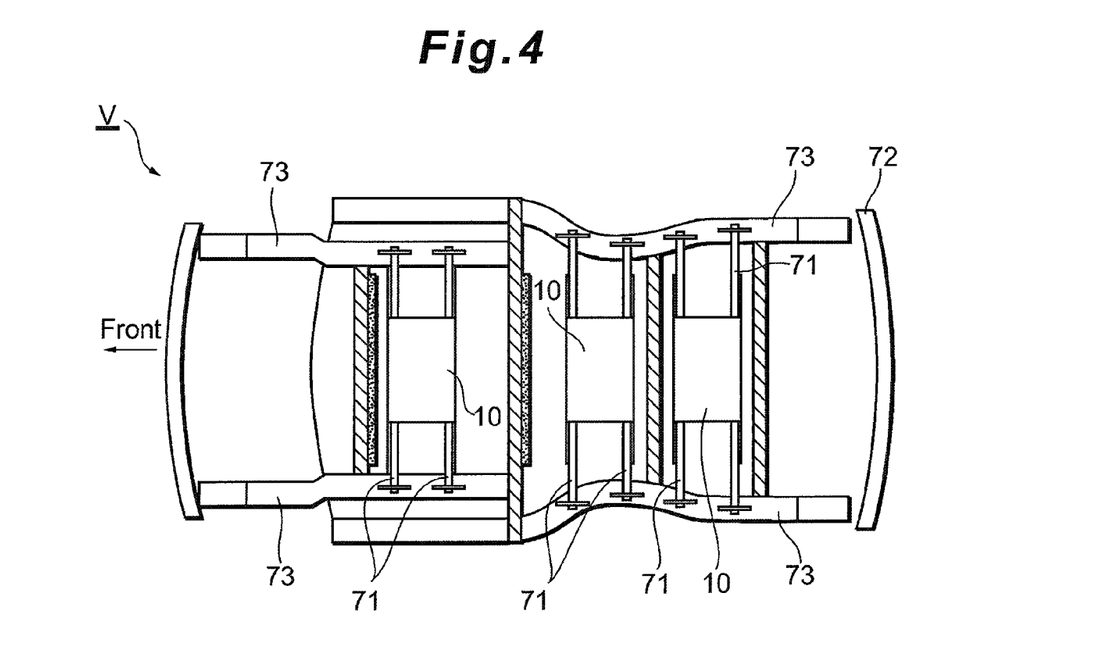
FIG. 4 is a plan view showing one example of a fuel cell vehicle on which a fuel cell module of the present embodiment is mounted.

The fuel cell module 10 can be used as a vehicle-mounted power generation system of, for example, a fuel cell vehicle. For example, the fuel cell module 10 of the present embodiment is attached onto structural members 71 constituting a base of the fuel cell vehicle (denoted with symbol V in FIG. 4) (see FIG. 4). In particularly, although not shown, in the present embodiment, the fuel cell case 4 can be fixed to the structural members 71 by use of fastening means such as bolts. It is to be noted that in FIG. 4, reference numeral 72 is a rear bumper of the fuel cell vehicle, and reference numerals 73 are side members. The structural members 71 are provided so as to bridge the left and right side bumpers 73 as shown in FIG. 4. In addition, there is not any special restriction on the number of the fuel cell modules 10 to be mounted on one fuel cell vehicle, but as one example, a case where three fuel cell modules 10 are mounted is shown in FIG. 4.

The holding portion 5 holds the fuel cell 1 on the fuel cell case 4 via, for example, the end plates 8 in the fuel cell module 10. There is not any restriction on the specific number of the holding portions 5. For example, in the present embodiment, three holding portions are used in total in which one holding portion 5 is used in a front part of one fuel cell module 10, and two holding portions are used in a rear part of the module. Each holding portion 5 of the present embodiment includes the first fastening member 51, the second fastening member 52 and the mount member 53 (see FIG. 5, etc.).

The first fastening member 51 holds the fuel cell 1 in a state in which a part of the member is bonded to the end plate 8. For example, in the present embodiment, a presser bolt having a part thereof screwed into a lower surface of the end plate 8 is used as this first fastening member 51 (see FIG. 5). The first fastening member 51 is screwed in a direction vertical to the cell laminating direction, and bonded to the end plate 8 of the fuel cell 1. For example, in the present embodiment, the first fastening member is screwed upward from the lower surface of the fuel cell 1, and bonded in the direction vertical to the laminating direction (see FIG. 5).

Figure 5:
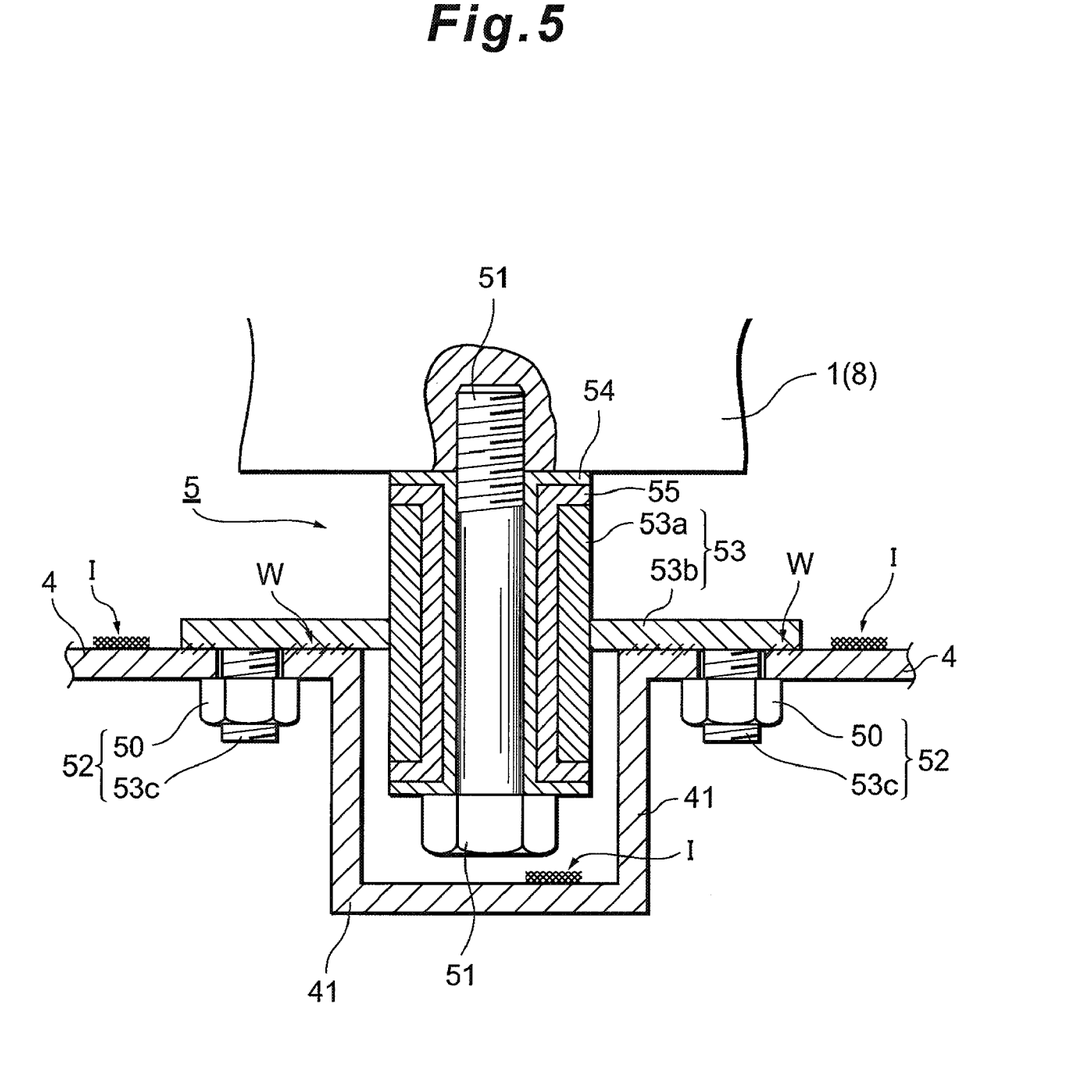
FIG. 5 is a sectional view showing a structure example of first and second fastening members and a mount member in the fuel cell module.

The mount member 53 is interposed between the first fastening member 51 and the fuel cell case 4 (see FIG. 5). This mount member 53 functions as a so-called mount insulator which absorbs and buffers vibration applied to a main body of the fuel cell 1 while holding the fuel cell 1 together with the first fastening member 51 and which maintains the fuel cell, the fuel cell case 4 and the like in an insulated state. The mount member 53 of the present embodiment is constituted of, for example, an elastic material (a vibration absorbing material), an insulating material or the like, and has a shape including a cylindrical portion 53a having a diameter larger than that of the first fastening member 51, and a plate-like portion 53b provided around the cylindrical portion 53a (see FIG. 5). The mount member 53 may further include a mount insulator 54 and a holding piece 55. This mount member 53 is fastened to the fuel cell 1 via the first fastening member 51 provided so as to pass through the cylindrical portion 53a. An outer periphery of an underside of the plate-like portion 53b is provided with external threads, and bolt portions 53c for use in fastening the mount member 53 and the fuel cell case 4 (see FIG. 5).

The second fastening member 52 is a member for fastening the mount member 53 and the fuel cell case 4. There is not any special restriction on a specific constitution of the second fastening member 52, but in the present embodiment, for example, the bolt portions 53c and nuts 50 screwed into the bolt portions 53c constitute the second fastening members 52 (see FIG. 5). The fuel cell case 4 is beforehand provided with through holes 42 through which the bolt portions 53c can pass, and the nuts 50 can be screwed into the bolt portions 53c protruded from the through holes 42 and fastened to fasten the mount member 53 and the fuel cell case 4 (see FIG. 5).

The fuel cell case 4 is provided with the protrusion part 41 which can cover a part of the first fastening member 51 described above while avoiding interference with the part (see FIG. 5). In the present embodiment in which, for example, the first fastening member 51, the mount member 53 and the like are used in the above-mentioned constitution, these first fastening member 51 and the mount member 53 are protruded downward from the lower surface of the fuel cell 1. The protrusion part 41 is formed in accordance with these protruding portions so that the protrusion part can attach to the fuel cell case 4 and cover the first fastening member 51 without interfering with the member. It is to be noted that the protrusion part 41 is formed as a part of the fuel cell case 4, and has a structure where moisture cannot permeate the protrusion part 41 from the outside. It is to be noted that there is not any special restriction on a specific shape of the protrusion part 41. FIG. 5 illustrates the protrusion part 41 having a comparatively simple shape, but a part of a sectional shape may be inclined or a corner thereof may be rounded. For example, the protrusion part 41 may be formed into a semispherical shape or a trapezoidal shape.

Moreover, in the present embodiment, at least a part of the inner surface of the protrusion part 41 is subjected to an insulation treatment. In this case, the insulated state can be secured, even in a case where a part of the fuel cell case 4 is deformed owing to interference with, for example, a road surface or the like, and the inner surface of the protrusion part 41 comes close to the first fastening member 51 or substantially comes in contact with the first fastening member. In particular, in a case where the fuel cell module 10 is not used in a stationary manner, and is used as a power source of the vehicle as in the present embodiment, even if accidental collision, interference or the like occurs, an electrically abnormal state can preferably be avoided to improve resistance characteristics. It is to be noted that there is not any special restriction on specific contents of such insulation treatment, and for example, insulating painting may be applied or another thin member for insulation may be attached. A place to be subjected to the insulation treatment is not limited to the inner surface of the protrusion part 41, and needless to say, a place other than the protrusion part 41 may be subjected. In FIG. 5, portions to be subjected to the insulation treatment (or portions which can be subjected to the insulation treatment) are denoted with symbols I.

As described above, the fuel cell module 10 of the present embodiment can produce peculiar functional effects that the number of assembling steps can be reduced and that the permeation of the moisture from the outside can be inhibited. That is, for example, in a case where the mount insulator cover for covering the first fastening member 51 and the mount member 53 is constituted as a separate component, the mount insulator cover has to be separately assembled. On the other hand, according to the present embodiment, this laborious operation is not necessary, and accordingly the number of the assembling steps can be reduced. There is not any possibility that the moisture permeates drain holes beforehand provided in the mount insulator cover. In this case, if a seal material or the like is provided in order to prevent the permeation of the moisture from gaps between bonded portions or the like, further trouble is required for the assembling, but in the present embodiment, such seal material or the like does not have to be provided. Furthermore, a waterproof insulation cap which has covered the first fastening member 51 and the mount member 53 is not required. In addition, in the present embodiment in which the fuel cell case 4 and the cover have a so-called integrated structure, there are advantages that the number of components and cost can be reduced and that weight can be reduced.

It is to be noted that the above embodiment is one example of the preferable embodiment of the present invention, but the present invention is not limited to this example, and can variously be modified without departing from the scope of the present invention. For example, the present embodiment has a structure in which the fuel cell case 4 and the mount member 53 are fastened, but from a viewpoint that the permeation of the moisture into the case be further suppressed, a contact surface (a contact region) between the fuel cell case 4 and the mount member 53 is preferably subjected to waterproof processing. In this case, the permeation of the moisture from the contact surface between the fuel cell case 4 and the mount member 53 is suppressed, and a waterproof property can further be improved. It is to be noted that in FIG. 5, portions subjected to the corresponding waterproof processing are denoted with symbols W.

INDUSTRIAL APPLICABILITY

According to the present invention, the number of assembling steps in assembling a fuel cell module can be reduced. Moreover, permeating of moisture from the outside can be suppressed.

Therefore, the present invention can broadly be used in the fuel cell module demanded in this manner.

The invention claimed is:

1. A fuel cell module comprising: unit cells which generate a power owing to an electrochemical reaction of a reactant gas; a cell laminate formed by laminating the plurality of unit cells; a fuel cell having a structure in which both ends of the cell laminate in a laminating direction of the cells are held by end plates; a fuel cell case in which the fuel cell is received; and a plurality of holding portions which hold the fuel cell via the end plates, wherein each of the holding portions includes a first fastening member having a part thereof bonded to the end plate, a mount member interposed between the first fastening member and the fuel cell case, and a second fastening member which fastens the mount member and the fuel cell case, the fuel cell case is provided with a protrusion part integrally formed with the fuel cell case and having such a shape as to cover the part of the first fastening member while avoiding interference with the part.

2. The fuel cell module according to claim 1, wherein a contact surface between the fuel cell case and the mount member is subjected to waterproof processing.

3. The fuel cell module according to claim 1, wherein at least a part of an inner surface of the protrusion part is subjected to an insulation treatment.

4. The fuel cell module according to claim 1, wherein the mount member functions as an insulator which absorbs and buffers vibration applied to the fuel cell and which maintains the fuel cell and the fuel cell case in an insulated state.

5. A holding device in a fuel cell module including: unit cells which fuel cell is generate a power owing to an electrochemical reaction of a reactant gas; a cell laminate formed by laminating the plurality of unit cells; a fuel cell having a structure in which both ends of the cell laminate in a laminating direction of the cells are held by end plates; a fuel cell case in which the received; and the holding device which holds the fuel cell via the end plates, the holding device comprising: a first fastening member having a part thereof bonded to the end plate; a mount member interposed between the first fastening member and the fuel cell case; and a second fastening member which fastens the mount member and the fuel cell case, the fuel cell case being provided with a protrusion part integrally formed with the fuel cell case and having such a shape as to cover the part of the first fastening member while avoiding interference with the part.

6. The fuel cell module according to claim 2, wherein at least a part of an inner surface of the protrusion part is subjected to an insulation treatment.

7. The fuel cell module according to claim 2, wherein the mount member functions as an insulator which absorbs and buffers vibration applied to the fuel cell and which maintains the fuel cell and the fuel cell case in an insulated state.

8. The fuel cell module according to claim 3, wherein the mount member functions as an insulator which absorbs and buffers vibration applied to the fuel cell and which maintains the fuel cell and the fuel cell case in an insulated state.

* * * * *

UNITED STATES PATENT AND TRADEMARK OFFICE
CERTIFICATE OF CORRECTION

Page 1 of 1

PATENT NO. : 8,119,303 B2
APPLICATION NO. : 12/302971
DATED : February 21, 2012
INVENTOR(S) : Haruhisa Niimi It is certified that error appears in the above-identified patent and that said Letters Patent is hereby corrected as shown below:

| Column | Line | |
|---|---|---|
| 12 | 6 | Before "received" insert --fuel cell is--. |

Signed and Sealed this
Eighteenth Day of December, 2012

David J. Kappos
*Director of the United States Patent and Trademark Office*